US007027956B2

United States Patent
Sinke et al.

(10) Patent No.: US 7,027,956 B2
(45) Date of Patent: Apr. 11, 2006

(54) APPARATUS AND METHOD FOR THE LOGGING AND SUBSEQUENT RETRIEVAL OF ENVIRONMENTAL DATA

(75) Inventors: Johannes Govert Sinke, Eindhoven (NL); Natasha Kravtsova, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/480,859

(22) PCT Filed: Jun. 20, 2002

(86) PCT No.: PCT/IB02/02436

§ 371 (c)(1),
(2), (4) Date: Dec. 16, 2003

(87) PCT Pub. No.: WO03/003316

PCT Pub. Date: Jan. 9, 2003

(65) Prior Publication Data

US 2004/0158436 A1    Aug. 12, 2004

(30) Foreign Application Priority Data

Jun. 29, 2001    (EP)    ................................ 01202498

(51) Int. Cl.
*G06F 19/00* (2006.01)
(52) U.S. Cl. ...................................... 702/187; 709/229

(58) Field of Classification Search ................ 702/187, 702/182–185, 188; 709/218, 229; 455/456, 455/457; 340/825; 342/357.06–357.09
See application file for complete search history.

(56) References Cited

U.S. PATENT DOCUMENTS

| 5,945,988 A | 8/1999 | Williams et al. ............ 345/327 |
| 5,995,094 A | 11/1999 | Eggen et al. ................ 345/328 |
| 6,343,317 B1 * | 1/2002 | Glorikian ..................... 709/218 |

OTHER PUBLICATIONS

"Remembrance Agent" A continuously running automated information retrieval system. pp. 1 to 6.
How RFC Works, p. 1 of 1.
RealNetworks Probe Begins by Leander Kahney 10 pages. (http://www.wired.com/news/technology/0,01282,32250,00.html).
PAPI Specification, pp. 1-74.

* cited by examiner

Primary Examiner—Edward Raymond

(57) ABSTRACT

The invention concerns an apparatus and method for the gathering of data relating to aspects of a user's surroundings, particularly to the logging and subsequent retrieval of environmental data. In embodiments of the invention, the apparatus comprises one or more logging stations (10), a data bank (20), a user station (30) and a contributor station (40). Each user has a user identifier card (50) on which logging preferences may be stored. Each logging station (10) is arranged for recognizing a period during which a user is present, and logging personal data according to the logging preferences while the user is present. Further, when the user is no longer at a particular logging station (10), the logging station in question transmits information including user ID and logged data to the data bank (20), from which the user station (30) may later retrieve the information.

18 Claims, 4 Drawing Sheets

APPARATUS AND METHOD FOR THE LOGGING AND SUBSEQUENT RETRIEVAL OF ENVIRONMENTAL DATA

The invention relates to an apparatus and method for the logging and subsequent retrieval of environmental data. Particularly, but not exclusively, to the logging and retrieval of such data related to specific persons.

On a day-to-day basis people are exposed to an enormous amount of data. Such data may be in the form of background music being played in shops, advertisements being displayed on television screens, data concerned with personal transactions such as shopping purchases etc. Naturally, an enormous amount of this data, (by far the vast majority) is inconsequential and of no use or benefit to the person experiencing it. However, from time to time such information which may have appeared to be incidental could be of use or interest to the user. For instance, during a visit to a restaurant a particular tune played over the radio may have been particularly pleasant and the announcement of song title and artist might have been missed. It would be useful to be able to obtain this missed information.

Currently, to re-create an experience where no conventional recording took place is really not possible. If one is not specifically recording something, the re-creation of a particular situation will then rely upon a user correctly memorizing it.

It is an aim of preferred embodiments of the present invention to provide some means by which environmental information from a user surroundings may be gathered in a simple, accessible manner and presented to the user at a later time upon request.

According to a first aspect of the invention, a method is provided for the logging and subsequent retrieval of environmental data, the method comprising the steps of:
(1) at a first location, recognizing a period during which a user is present;
(2) while the user is present at the first location, gathering environmental data concerning at least one aspect related to the user's environment at the first location; and
(3) sending information relating to logged data to a data bank for subsequent retrieval.

The method preferably further includes the step (4) of:
the data bank receiving the information from the first location and determining from the information sent, whether the user is a user registered in this data bank and the data bank associating the data sent by the first location to the particular user.

In a step (5), the information that is stored in the data bank is preferably available for access by the user. Preferably, personalized filtering services for selectively retrieving gathered data are offered to the user when the user accesses the data bank in step (5). The data bank preferably acts as a trusted third party. According to user preference the trusted third party may offer feedback to the location in step (1). Preferably, said user preferences further include environmental preferences and, said logging station is arranged for reading said environmental preferences and setting a user environment according to those preferences.

In step (1) the user's presence is preferably recognized by interaction between a logging station at the first location and a user identifier. Such interaction may comprise recognizing the proximity of the user identifier to the logging station. The data bank may mediate between the location and the user, to meet the desires and needs of the user.

The location in step (1) is preferably able to request user preferences from the data bank. If the request meets the interest of the user, the data bank is preferably arranged for supplying user profile information to the location. In step (2) user preferences contained in the user profile may dictate said one or more aspects related to the user's environment.

The method may comprise in the data bank the further step of:
(6) offering retrieval services to support the user in retrieving relevant information that has been stored.

In step (4) recognition of a particular user is preferably achieved by comparing a user ID contained in the information with data from a user identifier database.

In step (5) information is preferably categorized within the user's personal area, according to user preferences. The information is preferably also categorized according to time of logging. Third parties may preferably send information to the databank for subsequent transmission to the user. Such third parties may store such information on behalf of the user, or transmit such information to the user by use of a user's personal email address.

In straightforward embodiments of the method, the user identifier is a simple ID tag that refers to a mailbox of the user, the location is able to recognize the ID tag of the user and associate environmental data with the presence of the user.

The location also preferably provides contextual information which may be, among other things, a time stamp showing the time at which the user is present at the location, and also information to define the location itself. The user mailbox may offer services to filter and manage the contextual and environmental information.

Consumer electronic devices are preferably enabled to access the user mailbox and collect relevant data. For example, a music juke box may gather all data related to music from of the mailbox.

According to another aspect of the invention, there is provided apparatus for the logging and subsequent retrieval of environmental data, the apparatus comprising:
one or more logging stations arranged for recognizing a period during which a user is present, logging personal data concerning at least one aspect related to the user's environment while the user is present and further arranged for transmitting information using a transmission means;
a data bank arranged for receiving said information and storing said information for subsequent retrieval; and
a user station for facilitating retrieval of the information in co-operation with the user.

The or each logging station preferably comprises a user ID detector for detecting the proximity of a user identifier indicating the presence of a user and an environmental information logger for the logging of personal data at the logging station during a period in which the user is present.

The information preferably comprises the personal data and a user ID read from the user identifier.

The information may also comprise time information indicating the times during which a user was present at the logging station. It may further include any of the following: one or more categories of information logged; a logging station identifier; further information.

The or each logging station preferably further includes timing means for time stamping logged information. The or each logging station preferably also includes transmission means for transmitting information logged by the environmental information logger to the data bank. Such transmission means may comprise a network connection.

The data bank preferably comprises means for recognizing a user ID amongst received information from one or more logging stations and a database for storing the information from said one or more logging stations according to user ID. The data bank may form an email store of the user station.

The data bank is preferably arranged for selectively filtering gathered information and accepting only selected information. Gathered information may be accessible to user devices connectable via a user interface. The user interface may be arranged for programming logging preferences that designate categories of data to be collected.

Said means for recognizing user IDs preferably comprises a user identifier database with which a received user ID within the information may be compared. Information is preferably stored in the database according to time of logging. Information may also be stored in said database according to a particular category of data logged.

Said data bank preferably further comprises transmission means for transmitting a message to the user station. Preferably, said transmission means comprises a network connection. Information may be transmitted to the user by means of an e-mail message. The message sent to the user preferably comprises one or more links in an e-mail message.

The data bank preferably further includes processing means for controlling general functions at the base station and interactions between the various elements.

The user station preferably comprises a user interface, a personal database and transmission and reception means. Messages from the data bank are preferably stored at the user station in the personal database.

The user interface preferably includes means for programming a user identifier. The user interface preferably includes means for programming logging preferences designating desired categories of data to be collected. The user interface may further include means for programming desired environmental preferences designating preferred environmental settings in the vicinity of certain logging stations.

For a better understanding of the invention, and to show how embodiments of same may be carried into effect, reference will now be made, by way of example, to the accompanying diagrammatic drawings in which.

In the following discussion, where environmental data is discussed, this term is intended to mean data related to and gathered from a user's immediate environment and is also referred to herein as personal data. Such an immediate environment may be, for instance, the vehicle a user is travelling in, a restaurant the user is eating in etc.

Figure 1:
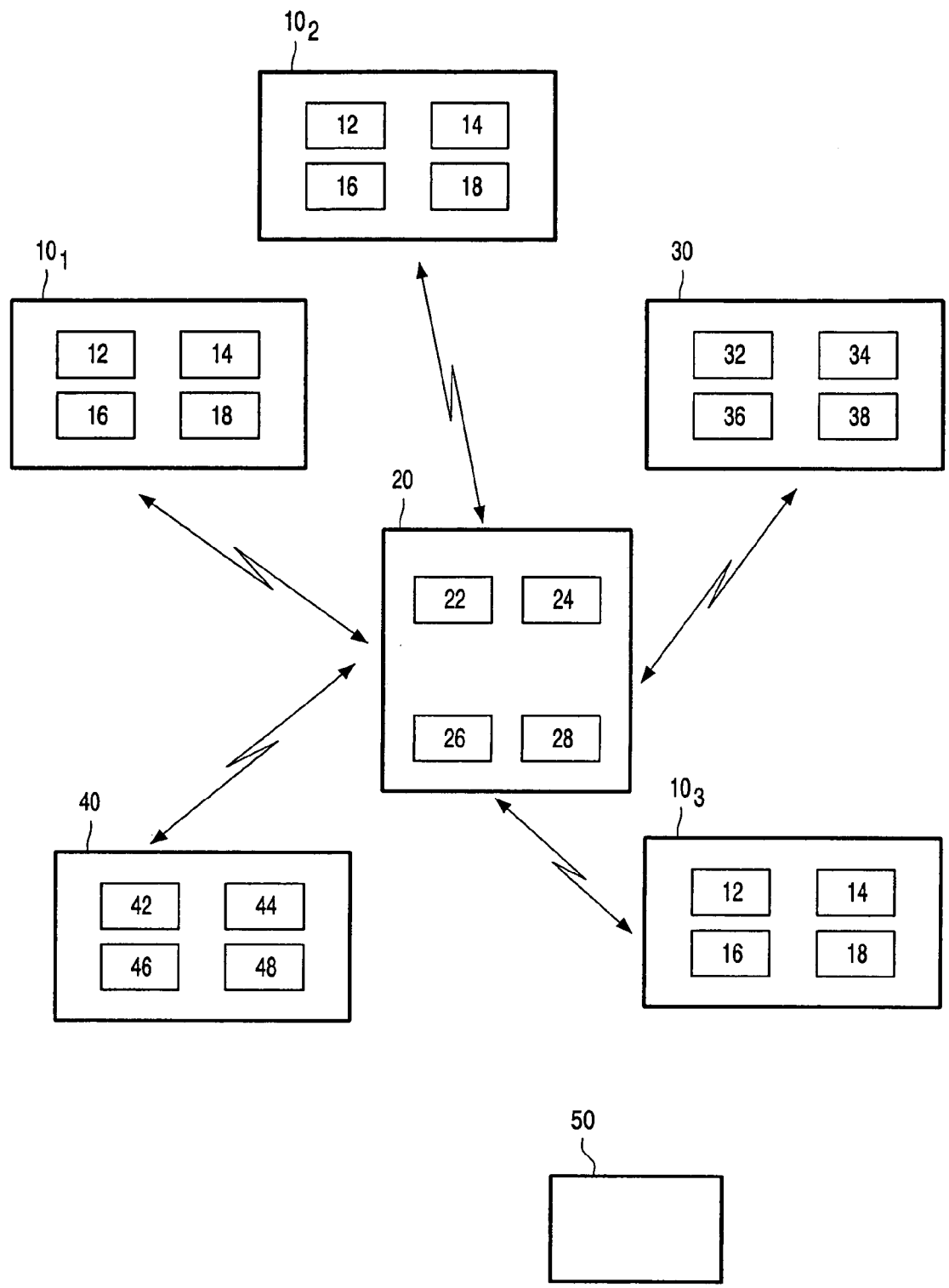
FIG. 1 shows an example of an apparatus for the gathering, manipulation and utilization of personal data according to the present invention.

Referring initially to FIG. 1, are shown a plurality of logging stations $10_1$ to $10_3$, a databank in the form of a base station 20, a user station 30 and a contributor station 40. A first logging station $10_1$, may, for instance, be located in a shop, a second logging station $10_2$ may be located in a user's car, a third logging station $10_3$ may be located at a concert venue.

Each logging station $10_1$ to $10_3$ comprises a user identity detector 12, a transceiver module 14, an environmental information logger 16 and a timer 18. The base station 20 includes a user identifier database 22, a transceiver module 24, a relational database 26 and processing means 28. The user station 30 comprises a user interface 32, a transceiver 34, a personal database 36 and a processing unit 38.

The contributor station 40 has, in fact, the same configuration as a user station 30 and includes a contributor interface 42, transceiver 44, personal database 46 and processing unit 48. In FIG. 1 is also illustrated in schematic form a user identifier which, in this embodiment is a user identification card 50.

Operation of the system of FIG. 1 will now be described. Consider a day on which a user may travel from his house, using his car and travel to a shop and then later travel to a concert. If the user is interested in gathering personal data concerning his environment during this day, he will ensure that before he leaves the house he puts his user ID card 50 into his pocket.

On getting into his car, the second logging station $10_2$ in the car recognizes, by the proximity of the user's ID card 50 itself, that the user has got into the car. Such recognition is made by the user ID detector 12. A signal from the user ID detector 12 is arranged for starting the timer 18 and starting the environmental information logger 16 which records the personal data.

The user identification card 50 may be a simple card carrying details of a user's email address, preferably in an automatically remotely detectable form. But it may also be a swipe card carrier requiring the user to swipe the card through user ID detector 12 on entry.

In a mobile environment such as a car, the personal data detected could be of a number of different types. For instance, the environmental information logger 16 may directly record information relating to the operation of the car and its subsystems. In this regard, it could include such items as instantaneous or average fuel consumption, maximum speeds reached, starting point and destination from a GPS system, details of music played on the in-car entertainment system etc. The types of information gathered by this logging station $10_2$ can be set according to user logging preferences.

These logging preferences may, for instance, be carried by the user ID card 50 and read from the ID card 50 by the ID detector 12, so that information not necessary to the particular user need not be collected by the environmental information logger 16.

As an alternative, logging preferences may be stored by the base station 20 and be downloadable on request to the logging stations $10_1$ to $10_3$. For instance, in a preferred embodiment the base station 20 includes stored user profiles containing user preferences and a request for retrieval of such profile may be made by a logging station at which a user is detected to be present.

The card (or user profile) may contain user preferences which may be read by the ID detector 12 for controlling the environment in the vehicle such as inside temperature, seat settings, default preferred radio settings etc. These preferences are referred to hereinafter as environmental preferences.

Upon the user's setting out of the car, the user ID detector 12 detects the fact that the user is no longer present and stops the timer 18 and this, in turn, may be used to terminate the logging of environment information by the logger 16. Where the card 50 is a swipe card, the user may terminate logging by performing a further swipe operation. Also this time, data logged by the environmental information logger 16 may be passed to the transceiver module 14 for uploading to the base station 20.

After the user has left his car, he might then, for instance, enter a shop in which a logging station 10₁ is also located. This logging station, operating in the same way as the logging station 10₂, can register the user's presence and log relevant environmental information for later uploading to the base station 20. In this case, such relevant information might relate to the times during which the user was in the shop, details of any items bought (such information being gathered by co-operation with a main shop price lookup computer) or such incidental information as the radio station details concerning background music being played in the shop. Again, the types of information desired to be uploaded to the base station 20 may be set according to user preferences on the user ID card 50 and read by the ID detector 12.

Finally, when the user goes to a concert at the concert venue in the evening, the logging station 10₃ may be arranged for registering the fact that the user is present and, at the end of the evening, uploading a play list that contains the songs performed during the concert. In this case, the environmental information logger 16 of the logging station 10₃ may be directly fed with the information concerning the play list, as it is a safe assumption that such types of information could be of interest to concert goers.

Let us consider now the operation of the base station 20. In certain embodiments, the base station 20 may be a trusted third party such as a service provider, which acts as an email repository, receiving logged data from the logging stations and, in preferred embodiments, providing user profiles to logging stations, to aid the logging stations log only relevant information.

It is already established that in the system described, environmental information is uploaded to the base station 20. Such uploading can be achieved in a number of different ways. For instance, each logging station and the base station may be connected over the Internet. Alternatively, there may be a wireless connection. Further, the transfer of the information itself may be made on the basis of requests from the logging stations or, on the basis of the base station 20 polling logging stations at various intervals.

As well as environmental information being passed to the base station 20, this information may be associated with one or more user identifiers. For instance, when information is received from the second logging station 10₂ which is in a user's car, only one user identifier is likely to be transmitted to the base station 20 along with the environmental information. On the other hand, with regard to the third logging station 10₃, the same play list information from the concert may be associated with a very large number of user identifiers. The base station 20 therefore needs to sort out information on the basis of user identifiers and then store the information for each user in the relational database 26.

In certain embodiments of the invention described, the case where a user ID card 50 also stipulates a user's preferences has been discussed. In other embodiments such preferences are transmitted to the logging stations on request. In such arrangements, only information which is potentially of interest to the user is uploaded to the base station 20, so that the transmission of definitely irrelevant information is avoided. The relational database 26 may contain filtering mechanisms based on declared user preferences to subcategorize information according to particular user preference categories, such as musical taste, automotive information, transaction information. These individual categories may either be set by the processing means 28 of the base station according to a standard schema or may be customized according to information given to the base station 20 by the particular user, by means of the user station 30 (to be described shortly).

The processing means 28 has a number of different functions. The processing means 28 controls the general operations of the base station 20 itself (which are standard computing functions and need not be explained any further) to aid the inputting of information received via the transceiver module 24 in the relational database 26 and to structure the database 26 according to user preferences received from individual users 30, again via transceiver module 24. The processing means also recognizes the link between information and individual users by manipulation of the user identifier database, so that information is always stored in the correct part of the relational database 26 and, similarly, always retrieved from the correct part of the database 26 upon the user's request.

The role of base station 20 as a trusted third party has been briefly discussed. In this role a base station may mediate between individual users, logging stations and other interested parties.

Each user station 30 is arranged for carrying out a number of different functions. In a first function of the user station 30, the user interface 32 may be utilized to program individual user ID cards 50 with reference information concerning the types of data of interest to that user. As indicated previously, such types of information may include, but not be limited to, information concerning transactions, information relating to audio or visual stimuli to which the user may be exposed in his immediate environment, automotive data etc. User interface 32 may also be used in connection with communication with the base station 20 so as to define appropriate categories in which gathered information from the various logging stations 10₁–10₃ is included.

The personal database 36 on the user station 30 may comprise, for instance, a dedicated e-mailbox. The data in this e-mailbox, rather than being merely text messages, may form links which are accessible to the user and can be used to call parts of information of interest from the relational database 26 of the base station 20. As an example, a link stored in this personal database may be provided with an identifier such as "concert play list 21 April". If the user then wishes to access the play list, or indeed to access information relating to this play list, then clicking on this link can send a message to the base station 20 by means of the transceiver 34 of the user station and the transceiver module 24 of the base station, the processing means 28 can then recognize this link, associate the link with the relevant entry in the relational database 26 and, if the requested information is present in this relational database 26, transmit this information directly back to the user station 30.

On the other hand, if the information is not present in full in the relational database 26, then a query may be sent to the logging station 10₃ which generated the original concert play list and the environmental information logger 16 at the concert venue may be accessed for more detailed information. More complex scenarios may be envisaged in which the information held at the concert venue at the logging station 10₃ may itself contain links relating to, for instance, group or band member websites or musical websites to enable the music itself, or biographies of band members etc. to be passed on to the user station 30.

The processing unit 38 of the user station 30 co-ordinates the actions between the user interface 32, personal database 36 and transceiver 34 and also regulates other standard procedures such as the operations of a user PC which the user station 30 may form part of.

FIG. 1 also shows a contributor station 40. As explained previously, this contributor station 40 may have the same basic make-up as a user station 30 and, indeed, may be a user station itself. The contributor station 40 may be arranged for sending information relevant to the user of user station 30 to the base station 20 to be stored in this user's section of the relational database 26.

For example, a contributor may be a friend of the user's and may wish to send the user a link relating to a concert that he himself has attended, but the user has not. This sending of information may be done by sending an appropriate user identifier and the information to the base station 20, which can then alert the user to the presence of such available information by sending an email to the user's personal database 36.

One particular preferred feature of the present invention is the use of a trusted third party to administer the base station 20. In this way, only the trusted third party will have personal information concerning individual users and will be able to match up environmental information from the various different logging stations to particular users. Contributors in this scenario would need to know an individual user's identity or possess a specialist e-mail address which the base station 20 will recognize, so that the base station 20 will realize that information from a particular contributor is intended for a particular user.

Also in preferred embodiments, all of the individual logging stations, the user station, the contributor station and the base station are interconnected by the world-wide web and the transceiver modules are typically network connections.

Figure 2:
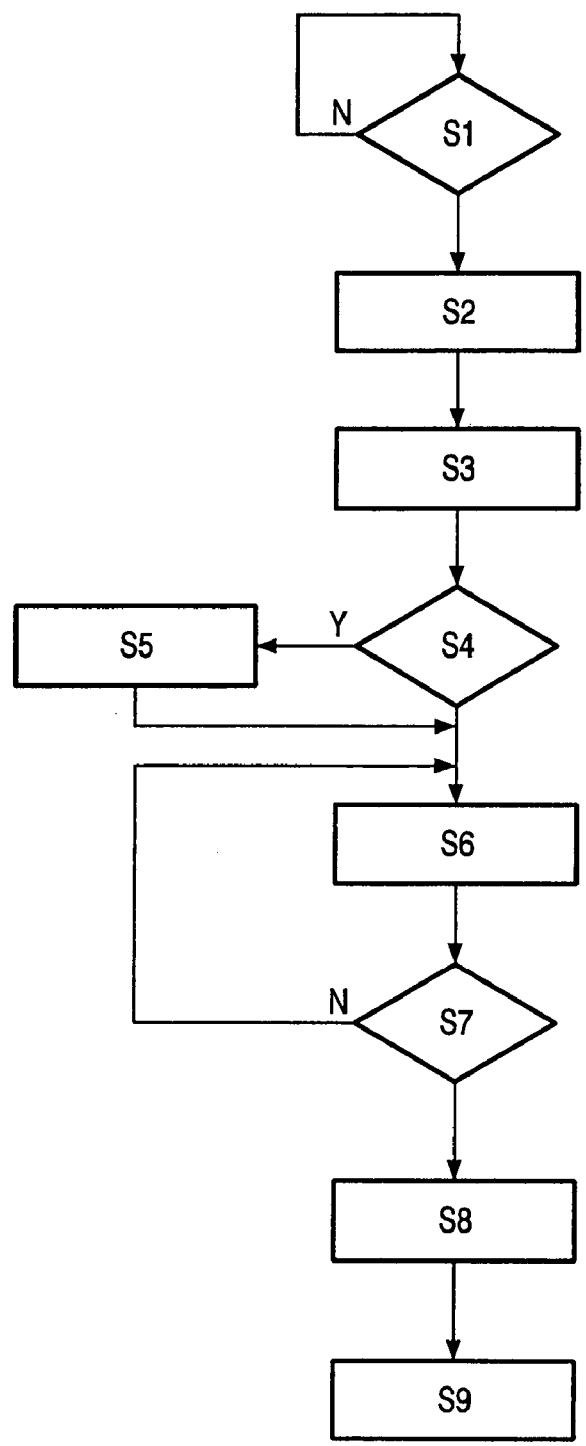
FIG. 2 is a flow chart illustrating the gathering of environmental data at a logging station according to an embodiment of the present invention.

An example of how information is gathered at a logging station and transmitted to a base station 20 is now given with the aid of FIG. 2. In FIG. 2 the following steps are associated with the references S1–S9;
S1=user present?
S2=log user "in" time
S3=read user ID and preferences
S4=has the user set any environmental preferences?
S5=set environment according to environmental preferences
S6=log environmental information according to user logging preferences
S7=user gone?
S8=log user "out" time and terminate logging
S9=upload logged data to base station Considering FIG. 2 in detail now, a logging station such as the logging station 10$_2$ in an idle condition performs a step S1 in which it checks whether or not a user is present. Checking whether a user is present is done by means of the user ID detector 12, which detects whether or not a user ID card 50 is in the vicinity. When a user ID card 50 is not in the vicinity, then step S1 loops back to itself until a user ID card 50 is detected.

Following detection of a user ID card, in step S2 an "in" time for the user is set, this "in" time being the time at which logging effectively starts. Once the user "in" time has been recorded, details from the user ID card 50 are read in step S3 and two types of preferences present on the card are analyzed.

A first type of preferences present on the user ID card 50 is referred to hereinafter as an "environmental preference". Environmental preferences relate to preferred environmental conditions of the user. As an example of this, where the logging station 10$_2$ is an automobile, the environmental preferences may relate to a user's preferred seat position, a user's preferred radio station etc. A second type of preferences registered on the card are the logging preferences and these relate to the type of data which the user is interested in having recorded.

In step S4, the system determines whether the ID card 50 includes any environmental preferences and, if so, in step S5 the environment is set according to these preferences.

In step S6, logging preferences of the user are read and environmental information is logged according to these preferences. For instance, in an automotive setting, such preferences may include logging of start position, destination, time spent tuned to a particular radio station etc. All these details are stored in the environmental information logger 16 of the remote radio station 10$_2$.

Logging continues until the user ID detector 12 detects that the user has passed beyond its range and, at that point, in step S8 a user "out" time is logged and environmental logging is terminated.

Finally, in step S9 logged data is uploaded from the logging station 10$_2$ to a base station 20, by means of the transceiver module 14. A format of the uploaded data may contain the following fields: user ID; time "in"; time "out"; environmental information gathered; categories in which information has been gathered; further information.

Figure 3:
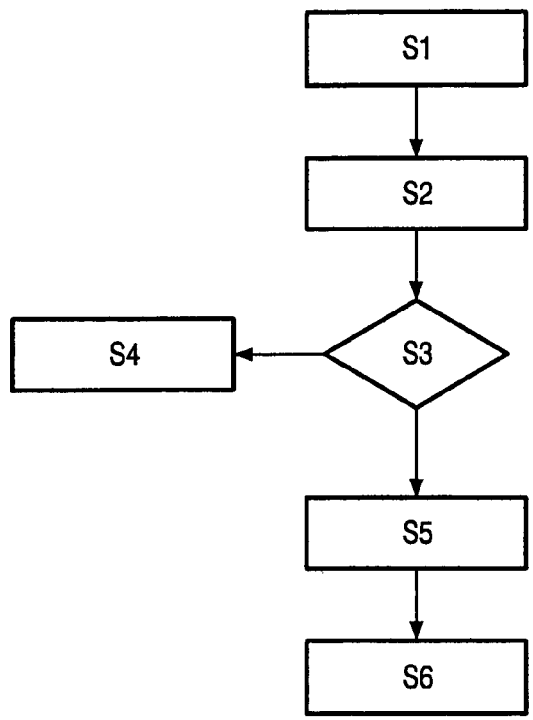
FIG. 3 is a flow chart illustrating the manipulation and storage of environmental data in a base station in accordance with an embodiment of the invention.

Referring now to FIG. 3, procedures at the base station when receiving information from a logging station will be described. In the Fig., the following actions relate to the labels S1–S5:
S1=receive information from logging station;
S2=check user ID against user ID database;
S3=is user ID known?
S4=Send Error message
S5=input data in user's personal area and categorize according to time of logging and categories of data;
S6=send e-mail to user.

Considering FIG. 3 in more detail now, the base station 20 in the step S1 receives information from a particular logging station, such as second logging station 10$_2$. The receipt of such information may be either at the request of the base station 20, or at a particular pre-arranged time, or may be according to a request from the logging station 10$_2$ itself.

In step S2, the information from the logging station 10$_2$ is analyzed and the user ID contained in the message is compared against a database of known users 22. If the user ID does not correspond to a known user, then the received information may be ignored and an error message sent back to the logging station in step S5 or, in an alternative not shown, an option may be offered to the logging station to register a new user ID.

If the user identifier is known, then in the step S5 data from the message is input into relational database 26 in a particular space allocated to the user designated by the user ID. Information is also categorized on the basis of time of logging and according to the category of data. For instance, the data may be categorized as being musical data, or automotive data and may accordingly be entered in the relational database 26.

Finally, in step S6 the base station 20 sends an e-mail message to the user station 30 pertaining to the user ID. This e-mail message may include, for instance, short descriptive information relating to the time of data logging which occurred and optionally the categories in which logging occurred. Other types of messages, such as SMS or MMS, can also be sent.

Figure 4:
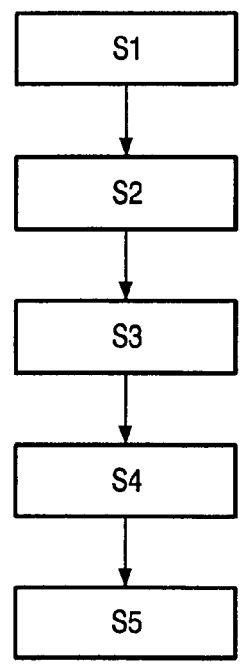
FIG. 4 is a flow chart illustrating user steps involved in retrieving logged data.

Referring now to FIG. 4, a flow chart is shown in which interaction between a user station 30 and the base station 20 is described. In the flow chart, the labels S1–S5 have the following meanings:
S1=review e-mails;
S2=select link of interest;
S3=interrogate base station;
S4=receive detailed information;
S5=follow detailed links to logger/other provider.

Considering the flow chart of FIG. 4 in more detail now, a user, after logging on to his personal user station 30, may decide to look at any e-mails received in his personal database 36. Such messages may have descriptive titles according to time, or place of information gathering, or categories of information or any combination thereof. If there is a particular time, place or category which the user is interested in, then he may select a particular email and select in it a link which allows him to access the relevant information in the base station 20. Selection of the link is listed in the flow chart as being S2.

The relational database 26 is interrogated by the user station in step S3 and more detailed information from the relational database 26 concerning the particular link selected is then sent to the user for review by the user in step S4.

Optionally, in a case where the user requires as much information as possible in step S5, the user may follow a detailed link by means of a special link, if present in the original information logged to access, for instance, the information logged in a particular logging station or a related external website. As an example of this type of detailed link-following, if the third logging station $10_3$ is a concert venue, the information uploaded to the base station 20 might include links concerning websites of the band that is performing at the concert venue, biographies of band musicians, play lists etc. The third logging station $10_3$ may alternatively be set to have these links resident in (or accessible via) an accessible database at the logging station itself and to include such link to itself in the "further information" field. Alternatively, such links may be inserted into the "further information" field to directly lead to some other source.

In the above description, a particular implementation of the invention has been described in which environmental information is logged and available to a user by the use of a specialist email address and a trusted third party.

Figure 5:
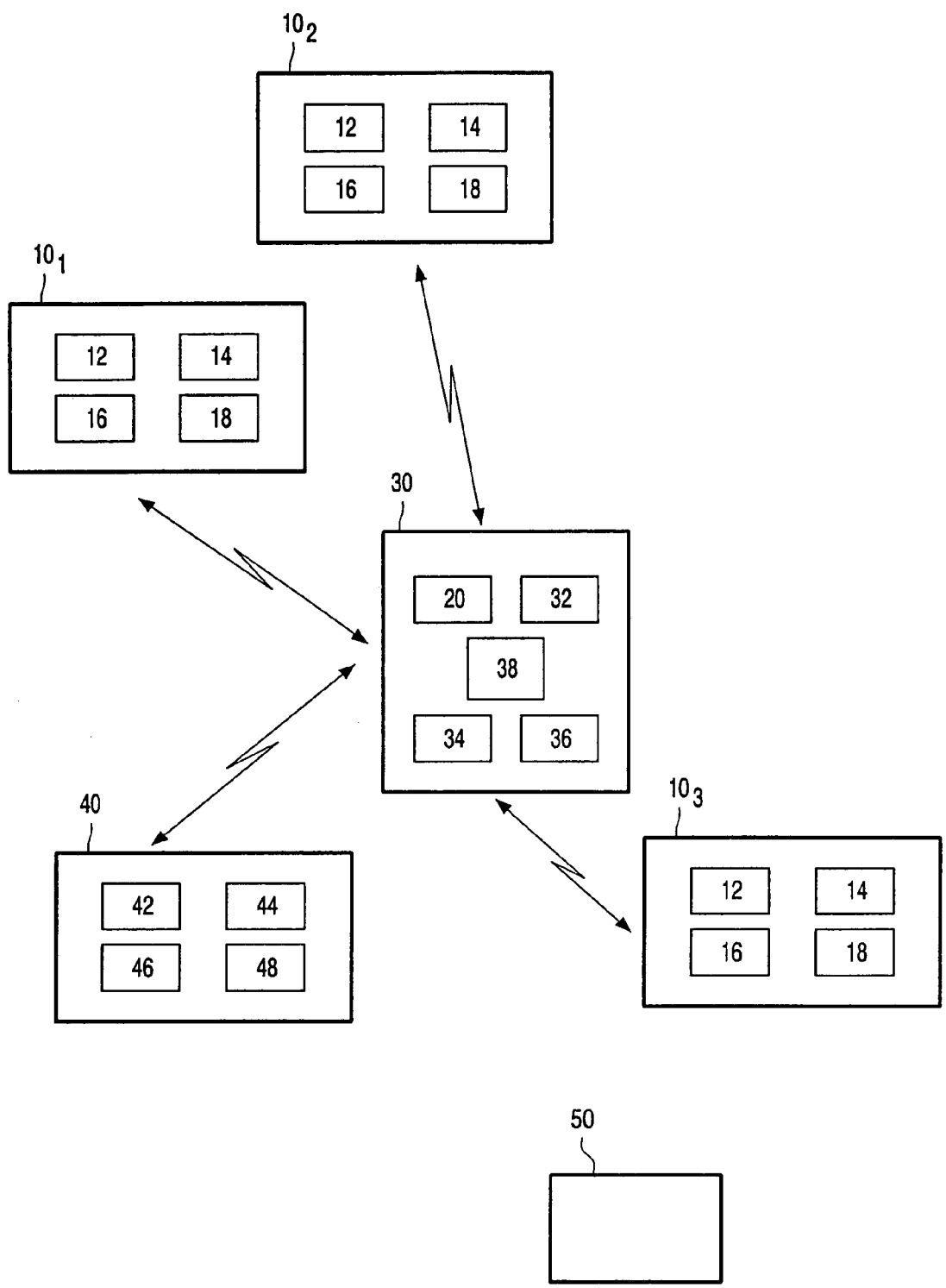
FIG. 5 illustrates a further embodiment of the invention.

FIG. 5 shows another implementation of the invention, in which like numerals designate like or similar elements to those described in the previous embodiment.

In the FIG. 5 arrangement, the data bank is formed by the personal database 36 (a user mailbox) and the need for a separate base station embodying data bank functionality is avoided. In the embodiment shown in FIG. 5, the user identifier 50 contains email address information of the user and the locations 10 send directly environmental and contextual information to the user's mailbox at a user station 30. An example of contextual information is information relating to the time at which the user was present and information identifying the location 10 itself. Software available to the user at the user station 30 may provide filtering functions so as to either accept all data from locations, or to accept selected data only. The accepted data may be stored in personal database 36.

It will also be appreciated that consumer electronics devices of the user may interact with user interface 32 of the user station 30 to access data from the database 36. For instance, a jukebox device of the user may access database 36 to load itself with musical data.

It will be appreciated that there are many other ways of implementing the present invention and these will be evident to the man skilled in the art.

What is claimed is:

1. A method for logging and subsequent retrieval of environmental data, the method comprising the steps of:
   (1) at a first location, recognizing a period during which a user is present;
   (2) while the user is present at the first location, gathering environmental data concerning at least one aspect related to the user's environment at the first location; and
   (3) sending information relating to logged data to a data bank for subsequent retrieval,
   wherein gathering environmental data comprises:
      receiving environmental data logging preferences of the user; and
      logging environmental data corresponding to the user's environmental data logging preferences.

2. The method as claimed in claim 1, further comprising the step (4) of the data bank receiving the information from the first location and determining from the information sent, whether the user is a user registered in this data bank and the data bank associating the data sent by the first location to the particular user.

3. The method as claimed in claim 2, further comprising the step (5) of making the information stored in the data bank available for access by the user.

4. The method as claimed in claim 3, wherein personalized filtering services for selectively retrieving gathered data are offered to the user when the user accesses data bank in step (5).

5. The method as claimed in claim 3 comprising in the data bank, the further step of (6) offering retrieval services to support the user in retrieving relevant information that has been stored.

6. The method as claimed in claim 2, wherein in step (4) recognition of a particular user is achieved by comparing a user ID contained in the information with data from a user identifier database.

7. An apparatus for the logging and subsequent retrieval of environmental data, the apparatus comprising:
   one or more logging stations arranged for recognizing a period during which a user is present, logging personal data concerning at least one aspect related to the user's environment while the user is present and further arranged for transmitting information using a transmission means;
   a data bank arranged for receiving said information and storing said information for subsequent retrieval; and
   a user station for facilitating retrieval of the information from the data bank,
   wherein the logging stations each comprise:
      a user identity detector adapted to detect a presence of the user at a location where the logging station is located;
      a timer adapted to track a time period during which the user is present at the location;
      an environmental data logger adapted to gather and locally store environmental data pertaining to the location and the time period during which the user is present at the location; and
      a data transceiver adapted to transmit the environmental data to a remotely located data bank.

8. The apparatus as claimed in claim 7, wherein the or each logging station comprises a user ID detector for detecting the proximity of a user identifier indicating the presence of a user and an environmental information logger for the logging of personal data at the logging station during a period in which the user is present.

9. The apparatus as claimed in claim 8, wherein the information comprises the personal data and a user ID read from the user identifier.

10. The apparatus as claimed in claim 9, wherein the information further comprises time information indicating the times during which a user was present at the logging station.

11. The apparatus as claimed in claim 7, wherein the data bank comprises an e-mail mailbox associated with the user station.

12. The apparatus as claimed in claim 11, wherein the data bank is arranged for selectively filtering gathered information and accepting only selected information.

13. The apparatus claimed in claim 11, wherein gathered information is accessible to user devices connectable via a user interface.

14. A logging station apparatus for collecting and storing environmental data, comprising:
 a user identity detector adapted to detect a presence of a user at a location where the logging station is located;
 a timer adapted to track a time period during which the user is present at the location;
 an environmental data logger adapted to gather and log environmental data pertaining to the location and the time period during which the user is present at the location; and
 a data transceiver adapted to transmit the environmental data to a remotely located data bank for storage therein.

15. The apparatus of claim 14, wherein user identity detector is further adapted to detect environmental data logging preferences of the user and wherein the environmental data logger logs environmental data corresponding to the user's environmental data logging preferences.

16. The apparatus of claim 14, wherein the user identity detector includes a card reader.

17. The apparatus of claim 14, wherein the apparatus is equipped in a motor vehicle, and the environmental data includes at least one of: (1) fuel consumption, (2) music played in the vehicle, and (3) a speed of the automobile during the time period when the user is present in the vehicle.

18. The apparatus of claim 14, wherein the apparatus is equipped in a retail establishment, and the environmental data includes at least one of: (1) an item purchased by the user; and (2) music played in the retail establishment during the time period when the user is at the retail establishment.

* * * * *